(12) United States Patent
Chen et al.

(10) Patent No.: US 8,509,361 B2
(45) Date of Patent: Aug. 13, 2013

(54) SIMPLIFIED ACQUISITION APPARATUS AND METHOD FOR A BLUETOOTH RECEIVER

(75) Inventors: Jeng-Hong Chen, Temple City, CA (US); Pansop Kim, Torrance, CA (US); Hsin-Hsiang Liu, Torrance, CA (US); Hsin-Hsu Chi, Hsinchu (TW)

(73) Assignee: ISSC Technologies Corp., Hsinchu (TW)

( * ) Notice: Subject to any disclaimer, the term of this patent is extended or adjusted under 35 U.S.C. 154(b) by 661 days.

(21) Appl. No.: 12/700,623

(22) Filed: Feb. 4, 2010

(65) Prior Publication Data

US 2011/0188614 A1 Aug. 4, 2011

(51) Int. Cl.
*H03D 1/00* (2006.01)
(52) U.S. Cl.
USPC ........... 375/343; 370/350; 329/306; 455/3.06
(58) Field of Classification Search
None
See application file for complete search history.

(56) References Cited

U.S. PATENT DOCUMENTS 3,997,847 A * 12/1976 Tong .............................. 329/306
2009/0086711 A1* 4/2009 Capretta et al. ............... 370/350

OTHER PUBLICATIONS

Haykin, Simon; Communication Systems; First Wiley Eastern Reprint 1979, p. 61.*
Park et al., "Specification of the Bluetooth System," version 2.0 +EDR, Nov. 4, 2004, pp. 1-1230, vols. 0-4.

* cited by examiner

*Primary Examiner* — Adolf Dsouza
(74) *Attorney, Agent, or Firm* — Birch, Stewart, Kolasch & Birch, LLP

(57) ABSTRACT

An acquisition scheme is provided for receiving a Bluetooth basic data rate (BDR) or enhanced data rate (EDR) packet. An acquisition apparatus for a Bluetooth receiver includes: a phase differentiator; a plurality of basic building blocks; a plurality of 1-bit switches; and a correlation computation equation. It features an acquisition circuit implementation with 1-bit correlator hardware shared by access code and EDR synchronization sequence correlation computations.

14 Claims, 5 Drawing Sheets

SIMPLIFIED ACQUISITION APPARATUS AND METHOD FOR A BLUETOOTH RECEIVER

BACKGROUND OF THE INVENTION

1. Field of the Invention

The present invention generally relates to an apparatus and method for a Bluetooth receiver, and more particularly for relating to simplified acquisition apparatus and method for a Bluetooth receiver, receiving a Bluetooth basic data rate (BDR) or enhanced data rate (EDR) packet. It features a simplified acquisition circuit implementation with a 1-bit correlator hardware shared by access code and EDR synchronization sequence correlation computations.

2. Brief Description of the Related Art

In a wireless communication system such as Bluetooth [Specification of the Bluetooth System, 2.0+EDR, 4 Nov. 2004], packet acquisition is the first step toward a successful packet reception. A lost packet, on the other hand, can cause degraded wireless link quality. A Bluetooth BDR/EDR packet contains a known access code of 68 or 72 bits (FIG. 1). An access code correlator is typically used in a Bluetooth receiver to detect the arrival of a Bluetooth packet and in the meantime, determines the coarse timing of the received packet. This is also known as the "packet acquisition" process. Since a Bluetooth device is typically battery-based, the current consumption of a Bluetooth device is extremely important.

A simplified Bluetooth acquisition circuit implementation with robust Bluetooth packet acquisition is, therefore, desired. An access code correlator, dependent on its sample resolution, can become a dominant (in circuit complexity and hence current consumption) part of a Bluetooth receiver. Since Gaussian frequency shift keying (GFSK) modulation is used for access code transmission, the simplest correlator implementation uses a 1-bit representation of the frequency deviation, derived from the received waveform samples, for its correlation computation. As a comparison, if an N-bit correlator is implemented, the amount of data buffered will be N times greater. As the packet detection is typically based on the computed correlation peak exceeding a certain threshold value, the trade-off is the accuracy in the correlation peak evaluation. And the Bluetooth acquisition circuit would cause degraded timing estimation, and in the worst case, a lost packet.

BRIEF SUMMARY OF THE INVENTION

It is an objective of the present invention to provide a simplified acquisition apparatus for a Bluetooth receiver.

The present invention offers an acquisition scheme for receiving a Bluetooth BDR or EDR packet. It features a simplified acquisition circuit implementation with a 1-bit correlator hardware shared by access code and EDR synchronization sequence correlation computations. A 4 MHz sampling rate is used for correlation computation. A SINC (sin (x)/x) interpolator is then used to get an 8 or 16 MHz timing resolution for data bit decoding. Based on the measurement results, this simple acquisition scheme can support successful decoding of a received Bluetooth packet with a maximum timing offset of +/−40 ppm and a maximum frequency offset of +/−60 ppm without loss of receiver sensitivity.

To achieve the objective, a simplified acquisition apparatus for a Bluetooth receiver which can perform correlation operation for both "received access code" (ACC) and "received synchronization sequence" (SYNC) of the enhanced data rate (EDR) comprises: a phase differentiator; a plurality of basic building blocks; M 1-bit switches in front of each row of the M rows; and a correlation equation. The phase differentiator is used for computing a phase difference of received samples and outputting a one-bit (1-bit) output or an M-bit output. The plurality of basic building blocks is used for computing a plurality of correlation output bits, which have M rows and J columns. The M 1-bit switches in front of each row of the M rows are used for selecting a plurality of input bits to a first building block of each row of the M rows either from a basic building block of a last column of previous row of the M rows or from the M-bit output of the phase differentiator. The correlation equation is used for computing an ACC correlation or a SYNC correlation from the plurality of correlation output bits of the plurality of basic building blocks.

According to one aspect of the present invention, the phase differentiator comprises: a plurality of delay blocks; a first switch; a subtraction unit; a frequency offset estimation; a M-bit quantizer; a 1-bit quantizer; and a second switch. The plurality of delay blocks is used for providing a current phase sample delay. The first switch is used for selecting an output from the plurality of delay blocks. The subtraction unit is used for computing a subtraction between the current phase sample and the output of the first switch to get a value and outputting a plurality of outputs. The frequency offset estimation is used for computing a threshold value which is a DC bias of the plurality of outputs of the subtraction unit. The M-bit quantizer is used for extracting M bit outputs from the plurality of outputs of the subtraction unit. The 1-bit quantizer is used for taking the threshold value and the plurality of outputs of the subtraction unit to extract a 1 bit output. The second switch is used for outputting either the 1-bit output from the 1-bit quantizer or the M bit outputs from the M-bit quantizer.

BRIEF DESCRIPTION OF THE DRAWINGS

All the objects, advantages, and novel features of the invention will become more apparent from the following detailed descriptions when taken in conjunction with the accompanying drawings.

DETAILED DESCRIPTION OF THE INVENTION

Although the invention has been explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiment.

Bluetooth (BT) is a standard for wireless communication devices. In the radio specification of the Bluetooth standard, the basic data rate (BDR) uses Gaussian frequency shift keying (GFSK) as modulation type. A BDR packet supports a physical link data rate of 1 Mbps. The enhanced data rate (EDR) uses differential phase shift keying (DPSK) as modulation type. Specifically, EDR uses π/4-differential quadrature phase shift key (DQPSK) and 8DPSK to support a physical link data rate of 2 Mbps and 3 Mbps, respectively.

Figure 1A:
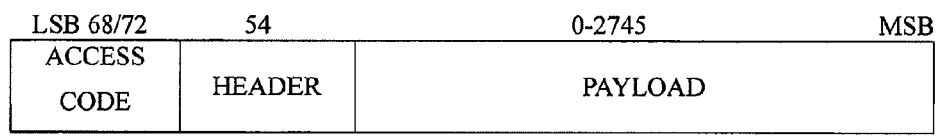
FIG. 1a shows a general BDR data packet format according to the prior art.
Figure 1B:
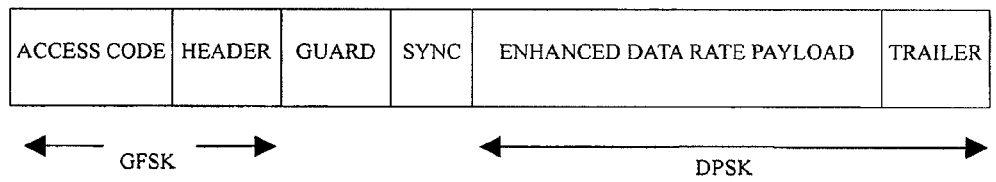
FIG. 1b shows a general EDR data packet format according to the prior art.

Referring to FIG. 1, it shows a typical Bluetooth data packet, with FIG. 1a showing a general BDR data packet format and FIG. 1b showing a general EDR data packet format. As is shown in FIG. 1a and FIG. 1b, the very beginning of a Bluetooth packet contains an access code of 68 or 72 bits. The data pattern of this access code is known at a Bluetooth receiver. The access code pattern is always known to the receiver and it will be assumed that the access code bit pattern is $[A_0, A_1, \ldots, A_{70}, A_{71}]$, with $A_0$ being the first transmitted bit. In case only 68 bits of access code is transmitted, the last 4 bits of the access code will not be transmitted.

Since BT uses slotted transmission, a BT receiver can be turned on immediately before a slot begins. The timing uncertainty is typically within 10 μs. With a BT receiver supposed to receive a BT packet within 10 μs, the acquisition scheme for receiving a BT packet can focus on minimizing its missed detection rate, and not to worry too much about its false alarm rate.

For simplicity of discussions below, we will assume that the received signal has been down-converted to baseband and properly filtered for noise rejection. Based on these received baseband in-phase and quadrature signal samples, $I_i$ and $Q_i$, (assuming the received signal has gone through an analog-to-digital converter at 4 Msps), one can first derive its corresponding phase samples at the i-th sampling time, $$\varphi_i = \tan^{-1}\left(\frac{Q_i}{I_i}\right) \text{ where } i = 0, 1, 2, \ldots$$

The phase samples will be used as input for our acquisition circuitry. GFSK modulation is used to transmit the access codes, where a binary one is represented by a GFSK waveform with positive frequency deviation, and a binary 0 is represented by a GFSK waveform with negative frequency deviation. Hence, the frequency deviation information needs to be derived from the received samples before a correlation-based packet detection scheme can be applied at a BT receiver.

The present invention is a simplified acquisition apparatus for a Bluetooth receiver which can perform correlation operation for both "received access code" (ACC) and "received synchronization sequence" (SYNC) of the enhanced data rate (EDR), which comprises: a phase differentiator 20; a plurality of basic building blocks 41; M 1-bit switches 44 in front of each row of the M rows; and a correlation equation. The plurality of basic building blocks 41 further comprises: a plurality of 1-bit delay blocks; an XOR (exclusive-OR) block 43 with an output bit $C_n(i)$, and an extra output bit $B_{m,j}(i)$. The plurality of 1-bit delay blocks is used for storing a plurality of outputs from a phase differentiator 20 and shifting a stored information 1b-at-a-time to next 1-bit buffers per sampling time. The XOR (exclusive-OR) block 43 is used for taking two bit inputs and computing an XOR output bit $C_n(i)$ for a n-th basic building block 41 of the plurality of basic building blocks 41 at an i-th sampling time, and one of two bit inputs is extracted from the phase differentiator 20 and another input bit is from a n-th bit of access code. The extra output bit $B_{m,j}(i)$ is from the plurality of basic building block 41 in a m-th row and a j-th column at the i-th sampling time, which is contained in some of the plurality of basic building block 41.

The phase differentiator 20 is used for computing a phase difference of received samples and outputting a one-bit (1-bit) output or an M-bit output. Additionally, the phase differentiator 20 comprises a DC bias (frequency offset) tracking loop. The DC bias (frequency offset) tracking loop adaptively measures the DC bias from a moving average of a latest output of the subtraction unit 23. The DC bias tracking loop further comprises: two multiplication units, an adder, and a delay unit. The first multiplication unit is used for involving a programmable parameter only bit-shift the input to get a value. The programmable parameter is one of ½, ¼, ⅛, ¹⁄₁₆, ¹⁄₃₂, ¹⁄₆₄, and ¹⁄₁₂₈. The second multiplication unit is used bit-shift the threshold value and then subtracted it from the threshold value itself. The adder then adds up the outputs of the two multiplication units. The delay unit is used for temporarily storing the threshold value. The plurality of basic building blocks 41 is used for computing a plurality of correlation output bits, which have M rows and J columns. The number of M rows is from 4 to 10, and the number of J columns is from 4 to 18.

The M 1-bit switches 44 in front of each row of the M rows is used for selecting a plurality of input bits to a first building block of each row of the M rows either from a basic building block 41 of a last column of previous row of the M rows or from the M-bit output of the phase differentiator 20. The correlation equation is used for computing an ACC correlation or a SYNC correlation from the plurality of correlation output bits of the plurality of basic building blocks 41. The correlation equation is either used for computing the ACC correlation from a plurality of XOR output bit $C_n(i)$ or used for computing the SYNC correlation from a plurality of the extra bits $B_{m,j}(i)$ with signs of SYNC sequence.

Figure 2:
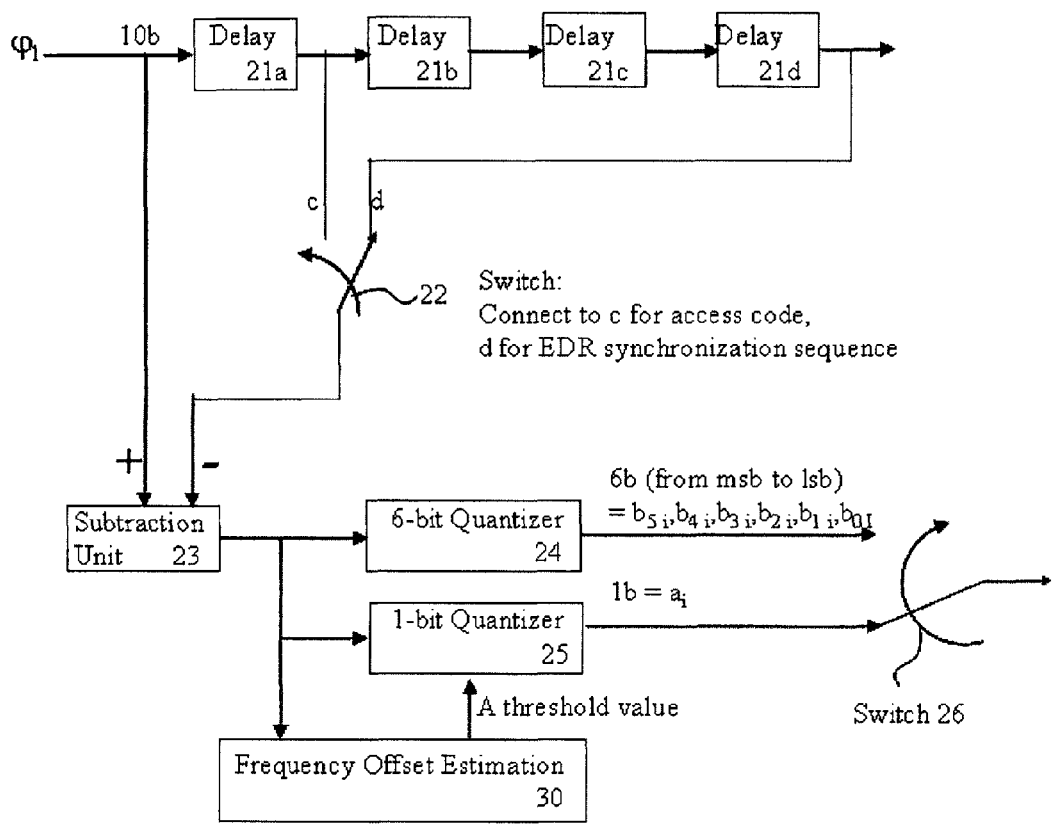
FIG. 2 shows a phase differentiator according to the present invention.

Referring to FIG. 2, it shows a phase differentiator 20 according to the present invention. For the simplicity, it is assumed that the sampling rate is 4 MHz which is four times of the data rate or symbol rate of GFSK or EDR, respectively. The phase differentiator 20 comprises: a plurality of delay blocks 21; a subtraction unit 23; a M-bit quantizer 24; a frequency offset estimation 30, a 1-bit quantizer 25, a first switch 22, and a second switch 26. The plurality of delay blocks 21 is used for providing a phase sample delay. The first switch 22 is used for selecting an output from the plurality of delay blocks 21. The subtraction unit 23 is used for computing a subtraction between the current phase sample and the output of the first switch 22 to get a value and outputting a plurality of outputs. The M-bit quantizer 24 is used for extracting M bit outputs from the plurality of outputs of the subtraction unit 23. The frequency offset estimation 30 is used for computing a threshold value which is a DC bias of the plurality of outputs of the subtraction unit 23. In other words, the frequency offset estimation 30 is used for computing the DC bias of the outputs from block 23 as the threshold value for the 1-bit quantizer 25. The second switch 26 is used for outputting either the 1-bit output from the 1-bit quantizer 25 or the M bit outputs from the M-bit quantizer 24. The 1-bit quantizer 25 is used for taking the threshold value and the plurality of outputs of the subtraction unit 23 to extract a 1 bit output. In other words, the 1-bit quantizer 25 is used for taking output value from block 23, comparing with the threshold value (DC bias) estimated from block 30, and then assigning a one-bit output. There are two modes of operations of the phase differentiator 20. If the input sample is the received access code as shown in FIG. 1b, the first switch 22 is connected to point c and the phase of consecutive samples which are one sample time apart is subtracted by block 23. At the end, the one-bit output from block 25 is selected by the second switch 26 as the output of the phase differentiator 20.

On the other hand, if the input sample is the received sync sequence in FIG. 1b, the first switch 22 is connected to point d and the phase of consecutive samples which are one DPSK symbol time apart is subtracted by block 23. At the end, the six-bit output from block 24 is selected by the second switch 26 as the output of the phase differentiator 20. The second switch 26 is used for outputing either a 1-bit output from the 1-bit quantizer 25 or a 6-bit output from the 6-bit quantizer. Additionally, the first switch 22 either outputs a phase of an input sample which is one sampling time delay from phase of current sample or outputs a phase of an input sample in the plurality of delay blocks 21 which is one differential phase shift keying (DPSK) symbol time delay from the current sample. The sampling time is from 4 MHz to 16 MHz. The second switch 26 also can either output an 1-bit of a phase difference of two consecutive input samples which are one sampling time apart or output a M-bit of a phase difference of two input samples which are one differential phase shift keying (DPSK) symbol time apart It is deserved to be mentioned that if the 1-bit is outputted, an output is a binary "1" when the phase difference is a non-negative value; otherwise, a binary "0" is selected as the output. On the other hand, if the M-bit is outputted, the phase difference is quantized into M bits as an output.

The phase samples $\phi_i$ first be processed by the phase differentiator 20. The plurality of delay blocks 21a-d provides the same one sample delay. The first switch 22 is a switch so that at the output of subtraction unit 23, (a) if the input is the received access code, the following phase difference sequence, which contains the frequency deviation information needed for access code correlation, is formed:

$$\delta_{acc,i} = \phi_i - \phi_{i-1} \text{ where } i=0, 1, 2, \ldots,$$   Eq. (1)

(b) if the input is the received EDR synchronization sequence, the following phase difference sequence is formed:

$$\delta_{syn,i} = \phi_i - \phi_{i-4} \text{ where } i=4, 5, \ldots$$   Eq. (2)

Since four times up-sampling is assumed, the phase difference is taken between two samples which are four sample times apart, i.e., one DPSK symbol time. Before the $\delta_{acc,i}$ or $\delta_{syn,i}$ sequence is fed to the correlator hardware, $\delta_{acc,i}$ first goes through a 1-bit quantizer 25 and $\delta_{syn,i}$ goes through the 6-bit quantizer 24. The 6-bit quantizer 24, simply extracts the top 6 bits of its input as its output bits: ($b_{5i}, b_{4i}, b_{3i}, b_{2i}, b_{1i}, b_{0i}$) from the most significant bit (MSB) to the least significant bit (LSB), as shown in FIG. 2. Two subscripts are used to indicate a bit "b" in the above, with the first subscript for its location in a 6-bit sample and the second subscript for its sampling time, i. Notice that the 1-bit quantizer 25 has two input sources: one is the output of subtraction unit 23 and the other is the output of frequency offset estimation 30. In case there is a frequency offset between the transmitter and the receiver, the 1-bit quantizer 25 cannot simply extract the top bit, i.e., the sign bit, of its input as its output. In this case, the frequency offset estimation 30, a simple frequency offset estimation circuitry, computes a threshold value, or equivalently, a frequency correction factor due to frequency offset between the transmitter and receiver, and outputs it to 1-bit quantizer 25. The 1-bit quantizer 25, then uses its input from subtraction unit 23 and this threshold value to compute its output $a_i$ as follows:

(1) $a_i$ is "1" (when its input value from block 23 exceeds the threshold value), (2) $a_i$ is "0" (otherwise).

Figure 3:
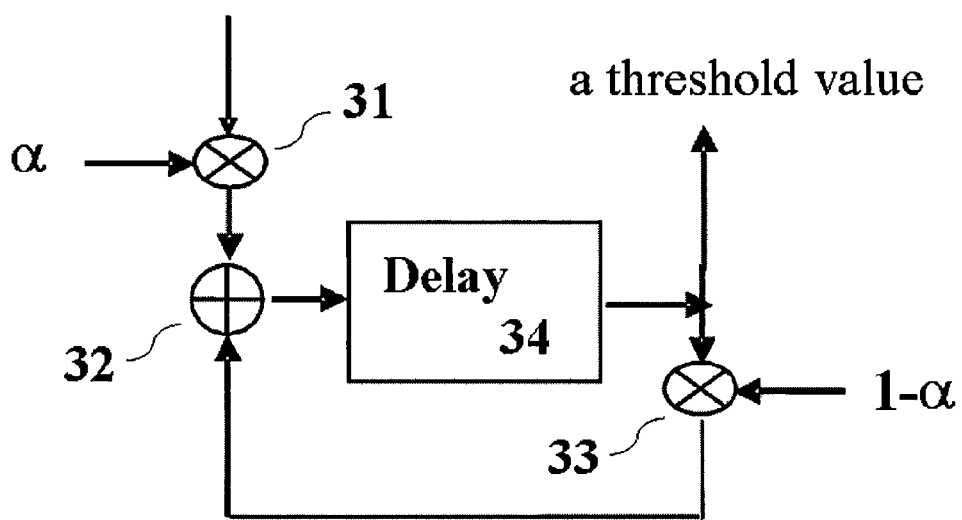
FIG. 3 shows a simple frequency offset estimation.

Referring to FIG. 3, it shows a simple frequency offset estimation 30. The frequency offset estimation 30 comprises: two multiplication units 31, 33, an adder 32, and a delay unit 34. The multiplication units 31, 33 are implemented from the programmable shift-and-add only circuitry. The delay unit 34 is used for shifting and adding the value 33 to obtain a threshold value. An exemplary design for frequency offset estimation 30 is shown in FIG. 3, where the programmable parameter a is typically set to ½, ¼, ⅛, 1/16, 1/32, or 1/64. This simple frequency offset estimation 30, takes its input from output of subtraction unit 23. This input is then go through multiplication, addition, and delay operations as shown in FIG. 3 (with the programmable parameter α) to generate a threshold value as its output. To be specific, the first multiplication unit 31 is used for involving a programmable parameter only bit-shift the input to get an output value. The programmable parameter is one of ½, ¼, ⅛, 1/16, 1/32, 1/64, and 1/128. The second multiplication unit 33 simply performs proper bit-shift (based on the same programmable parameter for the first multiplication unit) of the current threshold value and then have it subtracted from the current threshold value itself. The adder 32 then adds up the outputs of the two multiplication units to get an updated threshold value. The delay unit 34 is used for temporarily storing the updated threshold value. This threshold value is then used by the 1-bit quantizer 25, as its parameter to process its input. With such a programmable parameter α, computations in multiplication unit 31 involve only bit-shift (and no "true" multiplication), computations in multiplication unit 33 involve only shift and add (no "true" multiplications either). Therefore, the simple frequency offset estimation 30 requires only shift, add and delay operations.

The reason that 6-bit quantizer 24 does not need to consider a frequency correction factor is because the frequency offset between the transmitter and the receiver can be well tracked during the Header (54 micro seconds long, FIG. 1a) portion of the packet (assuming proper tracking circuitry), which occurs after packet acquisition, and the input phase samples during the synchronization sequence already have had a frequency error corrected according to the tracking loop in FIG. 3.

Figure 4:
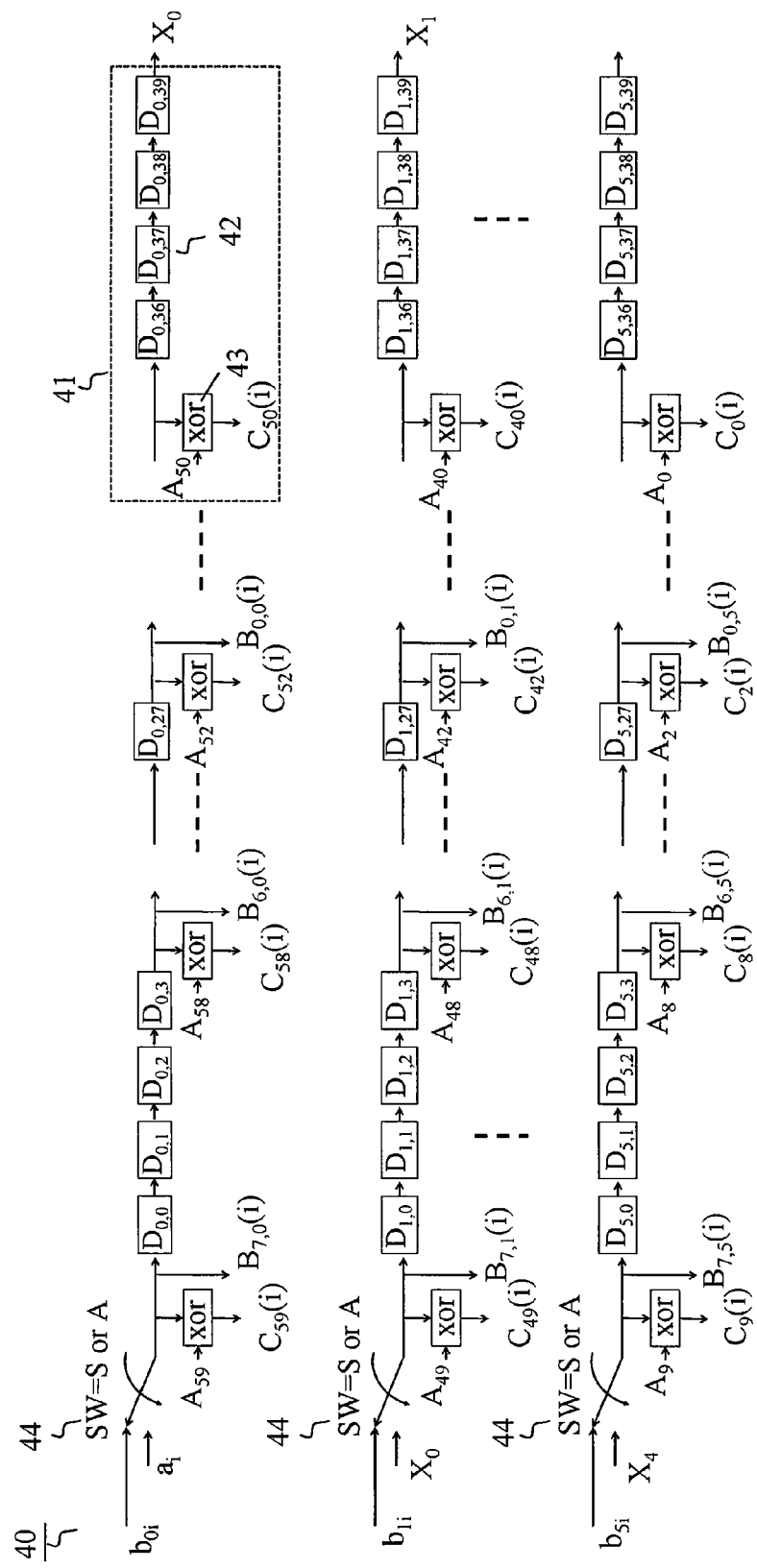
FIG. 4 shows a simplified BT correlator according to the present invention.

FIG. 4 shows a simplified 1-bit BT access code correlator circuit implementation, which is the core of this innovation. Since an N bit correlator requires N times the hardware buffers for correlation computations compared to a 1-bit correlator, comprehensive computer simulations have been performed to ensure that such a simplest 1-bit correlator does not cause any receiver performance degradation during BT packet acquisition. FIG. 4 shows how the ingredients needed for the correlation computation are obtained at a sampling rate of 4 MHz. In this exemplary implementation, the correlator circuitry contains 6 rows of 10 basic building blocks 41, with a basic building block 41 shown in a dash box in FIG. 4. There are 6 1-bit switches 44 in front of the first building blocks 41 of the 6 rows. As is shown in the plurality of basic building blocks 41, a basic building block 41 contains 4 "1-bit delay" blocks 42 and an XOR ("exclusive or": output bit=1 when two input bits are different, output=0, otherwise) block 43. Depending on the location of the building block in the row, each basic building block 41 can have an extra output bit. Specifically for this exemplary implementation, the first 8 building block 41 in the same row has an extra output $B_{k,r}(i)$, where $k=7-j$ ($j=0, 1, \ldots, 7$) for the j-th building block 41 in the r-th row ($r=0, 1, 2, \ldots 5$), and index "i" denotes the i-th sampling time. Note the index for the first building block 41 in a row starts at 0, and the index the first row also starts at 0. The XOR function takes two 1-bit inputs and computes an "exclusive or" output, $C_n(i)$ where the index n=59-1 for the l-th (l=0, 1, \ldots, 59) basic building block 41 and index "i" denotes the i-th sampling time (at 4 MHz rate). Note in the above, l=j+r*10, for the j-th basic building block 41 in the r-th row. In FIG. 4, one of the two 1-bit inputs to the XOR function is from the output of the phase differentiator 20, and another 1-bit input is based on the known access code pattern. To compute the access code correlation correctly, the input to the XOR block 43 in the l-th basic building block 41 is the 1-bit access code, $A_{59-l}$ (l=0, 1, ... 59), which is either a binary "1" or "0" defined in the Bluetooth [Specification of Bluetooth System, 2.0+EDR, 4 Nov. 2004].

During packet acquisition (when SW=A in FIG. 4), the 1-bit output sequence $a_i$ from the phase differentiator 20 shown in FIG. 2 is fed into this correlator, one after another at 4 MHz rate. For the $i^{th}$ 4 MHz sampling time, one bit $a_i$ is shifted into the correlator circuitry. At the end of the row, the last basic building block 41 has its output bit fed into the first basic building block 41 in the next row. The data flow continues while the access code correlation is computed based on the following equation at a 4 MHz rate:

$$Y(i) = 60 - \sum_{n=0}^{59} C_n(i) \quad \text{Eq. (3)}$$

In this exemplary example, there are 6×10=60 XOR blocks 43 in the 60 building blocks 41 that compute the 60 (of total 72) access code correlation. If a particular 1-bit output from the phase differentiator 20 is the same as that particular access code bit, the output of that particular XOR block 43, $C_n(i)$, is zero which indicates a correct correlation. Otherwise, the output of that particular XOR block 41 is one to indicate that an error occurs. Therefore, the access code correlation output is ranging from 0 (all errors) to 60 (all correct). The optimal timing is chosen at the i-th sampling time which has the highest access code correlation output and it is larger than a threshold to be considered that a valid packet is acquired.

During EDR synchronization sequence correlation computation (when SW 44=S in FIG. 4), the data flow is a bit different. The input is still the output of the phase differentiator 20. However, there are a total of 6 bits ($b_{5i}$, $b_{4i}$, $b_{3i}$, $b_{2i}$, $b_{1i}$, $b_{0i}$) now as inputs for each 4 MHz clock cycle. Each row of the 10 basic building blocks 41 has its independent input bit for each 4 MHz clock cycle. The r-th row (r=0, 1, 2, ... , 5) has an input bit $b_r$,i during the i-th 4 MHz clock cycle. Or equivalently, each row now is independently buffering one of the 6-bit inputs.

As is shown in FIG. 4:

Step 1, let $B_k(i)$ denote the 6-bit representation of the 6-bit phase differentiator output, $B_{k,5}(i)$, $B_{k,4}(i)$, $B_{k,3}(i)$, $B_{k,2}(i)$, $B_{k,1}(i)$, $B_{k,0}(i)$, in a binary format from MSB to LSB as follows:

$$B_k(i)=B_{k,5}(i)B_{k,4}(i)B_{k,3}(i)B_{k,2}(i)B_{k,1}(i)B_{k,0}(i); k=7, 6, \ldots, 1, 0 \quad \text{Eq. (4)}$$

The BT EDR synchronization sequence correlation can then be computed as shown in FIG. 4b, Step 2, using the following equation:

$$Y(i)=B_0(i)-B_1(i)+B_2(i)-B_3(i)+B_4(i)-B_5(i)-B_6(i)+B_7(i) \quad \text{Eq. (5)}$$

Figure 5:
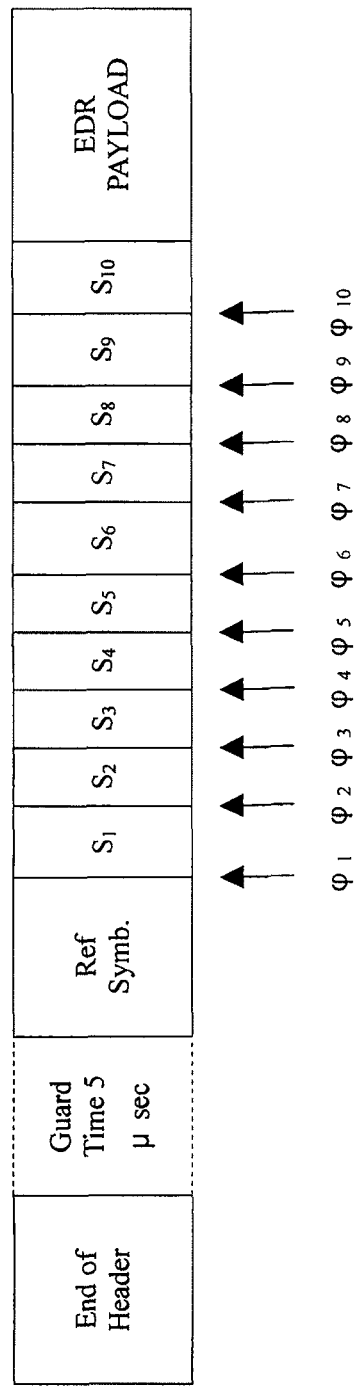
FIG. 5 shows the BT EDR synchronization sequence according to the prior art.

Eq. (5) is an exemplary implementation. It uses the first 8 "phase difference" information in the EDR synchronization sequence (FIG. 5) for a correlation computation. As is shown in FIG. 5, the polarity of the phase difference for the synchronization sequence [$\phi_1$, $\phi_2$, $\phi_3$, $\phi_4$, $\phi_5$, $\phi_6$, $\phi_7$, $\phi_8$, $\phi_9$, $\phi_{10}$] is $$[+,-,+,-,+,-,-,+,+,+] \quad \text{Eq. (6)}$$

with $\phi_1$ being the first transmitted phase information. The phase changes between the DPSK symbols shall be [$\phi_1$, $\phi_2$, $\phi_3$, $\phi_4$, $\phi_5$, $\phi_6$, $\phi_7$, $\phi_8$, $\phi_9$, $\phi_{10}$]=[$3\pi/4$, $-3\pi/4$, $3\pi/4$, $-3\pi/4$, $3\pi/4$, $-3\pi/4$, $-3\pi/4$, $3\pi/4$, $3\pi/4$, $3\pi/4$]. Notice that the +/− signs in front of the $B_i$'s in Eq. (5) match exactly the first 8 polarities in Equation (6) to compute the correlation correctly.

Thus,
(1) When SW=A, computing the i-th Access Code correlator output using Eq. (3);
(2) When SW=S
Step 1: Form a 6-bit $B_k(i)$ by recombining 1-bit $B_{k,5}(i)$, $B_{k,4}(i)$, $B_{k,3}(i)$, $B_{k,2}(i)$, $B_{k,1}(i)$, $B_{k,0}(i)$ as shown in Eq. (4)
Step 2: Compute the i-th EDR synchronization sequence correlator output using Eq. (5)

In summary, (a) a 1-bit correlator circuitry implementation is delineated, which minimizes its buffer requirement by taking the most significant bit out of the frequency-error corrected phase-difference samples during packet acquisition and performs a 1-bit correlation computation based on (Eq. 3), and (b) the same correlator buffers are effectively reused for the EDR synchronization correlation computation.

With this correlator circuitry, one correlation output is obtained every 250 ns (at 4 MHz rate). These correlator outputs can then be compared, sequentially at 4 MHz rate, with a preset threshold for proper packet detection or EDR synchronization sequence timing detection.

Although the above description uses an exemplary implementation for discussions, one skilled in the art can easily modify this implementation to achieve similar hardware simplification, as long as it uses a 1-bit access code correlator, and in case of decoding an EDR packet, shares this hardware buffers for the EDR synchronization sequence correlation computations. It is worth to mention that it is not required to have a full correlation of total 72 access codes or synchronization sequences which consists of 11 DPSK symbols (up to 10 phase differences for the synchronization sequence correlation computation) in order to have a successful packet acquisition operation. Depending on the timeline of the real-time operation of a product, a partially correlation of access code or EDR synchronization sequence which involving different number of sampling rates and bit-lengths is usually performed. Therefore, the number of columns of the basic building blocks 41 can be less than ten. i.e., the number of signs of the EDR synchronization sequence. On the other hand, the total number of basic building blocks 41 (which equals to the number of rows multiplies with the number of columns) can be less than 72, i.e., the total number of access code.

As an example, one can change the sampling rate to 4 MHz, 6 MHz, 8 MHz, 10 MHz, 16 MHz, or higher, then each building block 41 will have 4, 6, 8, 10, 16 or a higher number of "1b-delay" blocks 42, respectively. As a second example, one can use a different number of bits in the EDR synchronization sequence correlation computation. On the other hand, one can use a different number of columns of the building blocks to share and calculate the correlations of Access code and EDR synchronization sequence. Furthermore, one can use more than 1 bit from phase differentiator 20 for access code correlation and still share a block 40 for the correlation of EDR synchronization sequence, e.g., the basic building block 41 contains two parallel "4-bit delay" blocks 42 for an access code correlation with 2-bit outputs from the phase differentiator 20.

More examples are provided as follows: If the EDR synchronization sequence correlation computation requires only 4 bits output from the phase differentiator 20, the block 40 can be designed as one with 4 rows and 10 to 18 columns of building blocks 41 since 4×18=72 which is the total number of Access code. Other embodiments can have 5 bits outputs from phase differentiator 20 resulting the block 40 with 5 rows and 8 to 14 columns of building blocks 41. Another embodiment can have 6 bits outputs from phase differentiator 20 resulting the block 40 with 6 rows and 8 to 12 columns of building blocks 41. Another embodiment can have 7 bits outputs from phase differentiator 20 resulting the block 40 with 7 rows and 8 to 10 columns of building blocks 41. Another embodiment can have 8 bits outputs from phase differentiator 20 resulting the block 40 with 8 rows and 8 to 9 columns of building blocks 41.

To determine the packet arrival time with a resolution better than 250 ns (with 4 MHz samples) for enhanced packet detection, one can use a simple interpolator to obtain better timing resolution, such as 8 or 16 MHz, for the access code correlation results before a correlation peak is identified. The timing corresponding to this correlation peak is the packet arrival time. Note that processing the interpolated correlator results can also slightly increase the robustness of packet detection as a true correlation peak can fall between two consecutive correlation results. Similar enhancements can also be obtained by applying a simple interpolator to the EDR synchronization sequence correlation outputs.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A simplified acquisition apparatus for a Bluetooth receiver which can perform a correlation equation for both "received access code" (ACC) and "received synchronization sequence" (SYNC) of enhanced data rate (EDR), comprising:
   a phase differentiator, used for computing a phase difference of received samples and outputting a one-bit (1-bit) output or an M-bit output;
   a plurality of basic building blocks, used for computing a plurality of correlation output bits, having M rows and J columns;
   M 1-bit switches in front of each row of the M rows, used for selecting a plurality of input bits to a first building block of each row of the M rows either from a basic building block of a last column of previous row of the M rows or from the M-bit output of the phase differentiator, wherein the correlation equation is used for
   (a) computing at most M×J, 1-bit, an ACC correlation with received samples from the plurality of correlation output bits of the plurality of basic building blocks of the phase differentiator by setting the above M 1-bit switches for selecting a plurality of input bits to a first building block of each row of the M rows from a basic building block of a last column of previous row of the M rows, and
   (b) computing at most J, M-bit, a SYNC correlation with received samples from the plurality of correlation output bits of the plurality of basic building blocks of the phase differentiator by setting the above M 1-bit switches for selecting a plurality of input bits to a first building block of each row of the M rows from the M-bit output of the phase differentiator.

2. A simplified acquisition apparatus for a Bluetooth receiver as claimed in claim 1, wherein the phase differentiator comprises:
   a plurality of delay blocks, used for providing a current phase sample delay;
   a first switch, used for selecting an output from the plurality of delay blocks;
   a subtraction unit, used for computing a subtraction between the current phase sample and the output of the first switch to get a value and outputting a plurality of outputs;
   a frequency offset estimation, used for computing a threshold value which is a DC bias of the plurality of outputs of the subtraction unit;
   a M-bit quantizer, used for extracting M bit outputs from the plurality of outputs of the subtraction unit;
   a 1-bit quantizer, used for taking the threshold value and the plurality of outputs of the subtraction unit to extract a bit output; and
   a second switch, used for outputting either the 1-bit output from the 1-bit quantizer or the M bit outputs from the M-bit quantizer.

3. A simplified acquisition apparatus for a Bluetooth receiver as claimed in claim 2, wherein the first switch can either output a phase of an input sample which is one sampling time delay from the phase of current sample or output a phase of an input sample in the plurality of delay blocks which is one differential phase shift keying (DPSK) symbol time delay from the current sample.

4. A simplified acquisition apparatus for a Bluetooth receiver as claimed in claim 2, wherein the second switch can either output an 1-bit of a phase difference of two consecutive input samples which are one sampling time apart or output a M-bit of a phase difference of two input samples which are one differential phase shift keying (DPSK) symbol time apart.

5. A simplified acquisition apparatus for a Bluetooth receiver as claimed in claim 4, wherein the 1-bit is outputted, an output is a binary "1" when the phase difference is a non-negative value; otherwise, a binary "0" is selected as the output.

6. A simplified acquisition apparatus for a Bluetooth receiver as claimed in claim 4, wherein the M-bit is outputted, the phase difference is quantized into M bits as an output.

7. A simplified acquisition apparatus for a Bluetooth receiver as claimed in claim 2, wherein the phase differentiator further comprises:
   a DC bias (frequency offset) tracking loop, used for adaptively measuring the DC bias from a moving average of an latest output of the subtraction unit.

8. A simplified acquisition apparatus for a Bluetooth receiver as claimed in claim 7, wherein the DC bias (frequency offset) tracking loop comprises:
   a first multiplication unit, used for involving a programmable parameter only bit-shift its input to get a value;
   a second multiplication unit, used to apply the same bit-shift on the current threshold value and then have the results subtracted from the current threshold value to get an output;
   an adder unit, used to add the results from the above two multiplication units together and get an updated threshold value; and
   a delay unit, used for temporarily storing the updated threshold value.

9. A simplified acquisition apparatus for a Bluetooth receiver as claimed in claim 8, wherein the programmable parameter is one of $1/2$, $1/4$, $1/8$, $1/16$, $1/32$, $1/64$, and $1/128$.

10. A simplified acquisition apparatus for a Bluetooth receiver as claimed in claim 1, wherein the plurality of basic building blocks comprises:
    a plurality of 1-bit delay blocks, used for storing a plurality of outputs from a phase differentiator and shifting a stored information 1b-at-a-time to a next 1-bit buffers per sampling time;

an XOR (exclusive-OR) block, used for taking two bit inputs and computing an XOR output bit $C_n(i)$ for a n-th basic building block of a plurality of basic building block at an i-th sampling time, one of two bit inputs is extracted from the phase differentiator and another input bit is from a n-th bit of access code; and an extra output bit $B_{m,j}(i)$, being from the plurality of basic building block in a m-th row and a j-th column at the i-th sampling time, contained in some of the plurality of basic building block.

11. A simplified acquisition apparatus for a Bluetooth receiver as claimed in claim 1, wherein the correlation equation is either used for computing the ACC correlation from a plurality of XOR output bit $C_n(i)$ or used for computing the SYNC correlation from a plurality of the extra bits $B_{m,j}(i)$ with signs of SYNC sequence.

12. A simplified acquisition apparatus for a Bluetooth receiver as claimed in claim 10, wherein the sampling time is from 4 MHz to 16 MHz.

13. A simplified acquisition apparatus for a Bluetooth receiver as claimed in claim 1, wherein the number of M rows is from 4 to 10.

14. A simplified acquisition apparatus for a Bluetooth receiver as claimed in claim 1, wherein the number of J columns is from 4 to 18.

* * * * *